(12) United States Patent
Chang et al.

(10) Patent No.: US 8,352,853 B2
(45) Date of Patent: Jan. 8, 2013

(54) COMPOSER CIRCUIT AND METHOD FOR ENCODING DEVICE INDEPENDENT MULTI-MODAL CONTENT

(75) Inventors: Angela Chang, Cambridge, MA (US);
Michael E. Caine, Needham, MA (US);
Edward A. Hirsch, Roxbury, MA (US);
Conor P. O'Sullivan, Chicago, IL (US);
Joonwoo Park, Chicago, IL (US);
Roberto Tagliabue, Beaverton, OR (US); Tadeo T. Toulis, Boston, MA (US); Lisa Y. Yong, San Francisco, CA (US)

(73) Assignee: Motorola Mobility LLC, Libertyville, IL (US)

(*) Notice: Subject to any disclaimer, the term of this patent is extended or adjusted under 35 U.S.C. 154(b) by 2171 days.

(21) Appl. No.: 11/171,075

(22) Filed: Jun. 30, 2005

(65) Prior Publication Data

US 2007/0005790 A1 Jan. 4, 2007

(51) Int. Cl.
*G06N 3/00* (2006.01)
(52) U.S. Cl. ............................................. 715/234
(58) Field of Classification Search ............... 715/234, 715/243, 254, 255; 379/372, 373.01, 372.02, 379/372.03, 372.04, 372.05, 374.01, 374.02, 379/374.03, 372.01, 373.04
See application file for complete search history.

(56) References Cited

U.S. PATENT DOCUMENTS

| | | | |
|---|---|---|---|
| 4,698,672 A | 10/1987 | Chen et al. | |
| 4,980,844 A * | 12/1990 | Demjanenko et al. | 702/56 |
| 5,359,712 A * | 10/1994 | Cohen et al. | 715/723 |
| 6,463,440 B1 * | 10/2002 | Hind et al. | 707/102 |
| 6,801,604 B2 | 10/2004 | Maes et al. | |
| 6,816,737 B2 | 11/2004 | Kim | |
| 2002/0194388 A1 | 12/2002 | Boloker et al. | |
| 2003/0184498 A1 | 10/2003 | Blumberg et al. | |
| 2004/0066932 A1 * | 4/2004 | Seligmann | 379/373.01 |
| 2004/0111673 A1 * | 6/2004 | Bowman et al. | 715/513 |
| 2004/0207542 A1 | 10/2004 | Chang et al. | |
| 2005/0010638 A1 | 1/2005 | Richardson et al. | |
| 2006/0085767 A1 * | 4/2006 | Hinckley et al. | 715/863 |
| 2006/0232614 A1 * | 10/2006 | Leroux | 345/698 |
| 2007/0282797 A1 * | 12/2007 | Wang et al. | 707/3 |

* cited by examiner

*Primary Examiner* — Kyle Stork (57) ABSTRACT

A method is provided for encoding device independent multi-modal content including an arrangement comprising one or more of a plurality of tokens, where each token corresponds to a standard predefined effect. The method includes defining a token for one or more standard predefined effects, wherein the token is adapted for being mapped to one or more effect producing elements in a target device. One or more tokens are then composed for playback together as an arrangement.

27 Claims, 10 Drawing Sheets

COMPOSER CIRCUIT AND METHOD FOR ENCODING DEVICE INDEPENDENT MULTI-MODAL CONTENT

FIELD OF THE INVENTION

The present invention relates in general to the creation and conveyance of multi-model content. More particularly, the present invention relates to the encoding of device independent multi-model content for conveyance between potentially disparate devices.

BACKGROUND OF THE INVENTION

There is a trend toward creating more immersive experiences, which in effect often entail creating experiences which involve a larger number or more of one's senses. At least a couple of examples include surround sound, wide screen displays, and the incorporation of vibratory effects. However in order to convey a more immersive experience, the experience will often involve a more complex set of signals having a larger number of components, which in turn require an increasing amount of network bandwidth and device output resolution, when the set of signals for creating the experience are conveyed between devices.

Enhancements in at least some experiences, such as multimedia experiences and/or gaming are increasingly including greater complexities in audio, video and haptics, which are principally experienced as part of previously authored or one-way content for rendering or play back on a target device, or where the interaction within the framework of the content presentation is largely scripted. However, as of yet, adoption of corresponding effects in two-way, i.e. user-to-user, communications has been extremely slow and/or largely non-existent. This may be attributable at least in part to the differences in the rendering capabilities of different end user devices and lack of a framework within which increasingly multi-modal experiences can be readily created and composed.

The present inventors have recognized that the creation and encoding of multi-modal content can be further facilitated by establishing a vocabulary of standard predefined effects in the form of tokens, which can be used to minimize the amount of information needed in creating, and subsequently communicating an effect, which can then be mapped, and scaled if necessary, to effect producing elements in a particular device.

SUMMARY OF THE INVENTION

The present invention provides for a method for encoding device independent multi-modal content including an arrangement comprising one or more of a plurality of tokens, each token corresponding to a standard predefined effect. The method includes defining a token for one or more standard predefined effects, wherein the token is adapted for being mapped to one or more effect producing elements in a target device. One or more tokens are then composed for playback together as an arrangement.

In at least one embodiment, the method further comprises associating a gesture with each of the tokens, receiving one or more gestures, and determining the token associated with each of the received gestures.

In at least a further embodiment, the method further comprises communicating the arrangement to a target device, mapping the tokens to one or more effect producing elements in the target device, and activating the one or more effect producing elements for which a token has been mapped in the target device in accordance with the arrangement of tokens.

The present invention further provides for a composer circuit for encoding device independent multi-modal content. The composer circuit includes a user input adapted for receiving a user selection corresponding to one or more tokens associated with one or more standard predefined effects. The composer circuit further includes a controller adapted for forming an arrangement of one or more tokens intended to define the one or more standard predefined effects to be produced by one or more effect producing elements in a target device.

The present invention still further provides for an effect producing circuit for playback of an arrangement of one or more tokens. The effect producing circuit includes a receiver for receiving an arrangement of one or more tokens associated with one or more standard predefined effects, a storage element including one or more prestored standard predefined effects, each prestored standard predefined effects being associated with a corresponding one of the one or more tokens. The effect producing circuit further including one or more effect producing elements, and a controller adapted for mapping the standard predefined effects associated with the tokens in the received arrangement with the one or more effect producing elements.

These and other features, and advantages of this invention are evident from the following description of one or more preferred embodiments of this invention, with reference to the accompanying drawings.

BRIEF DESCRIPTION OF THE FIGURES

The present invention will be described by way of exemplary embodiments, but not limitations, illustrated in the accompanying drawings in which like references denote similar elements, and in which.

DETAILED DESCRIPTION

As required, detailed embodiments of the present invention are disclosed herein, however, it is to be understood that the disclosed embodiments are merely exemplary of the invention, which can be embodied in various forms. Therefore, specific structural and functional details disclosed herein are not to be interpreted as limiting, but merely serve as a basis for the claims and as a representative basis for teaching one skilled in the art to variously employ the present invention in virtually any appropriately detailed structure. Further, the terms and phrases used herein are not intended to be limiting, but rather, to provide an understandable description of the invention.

Figure 1:
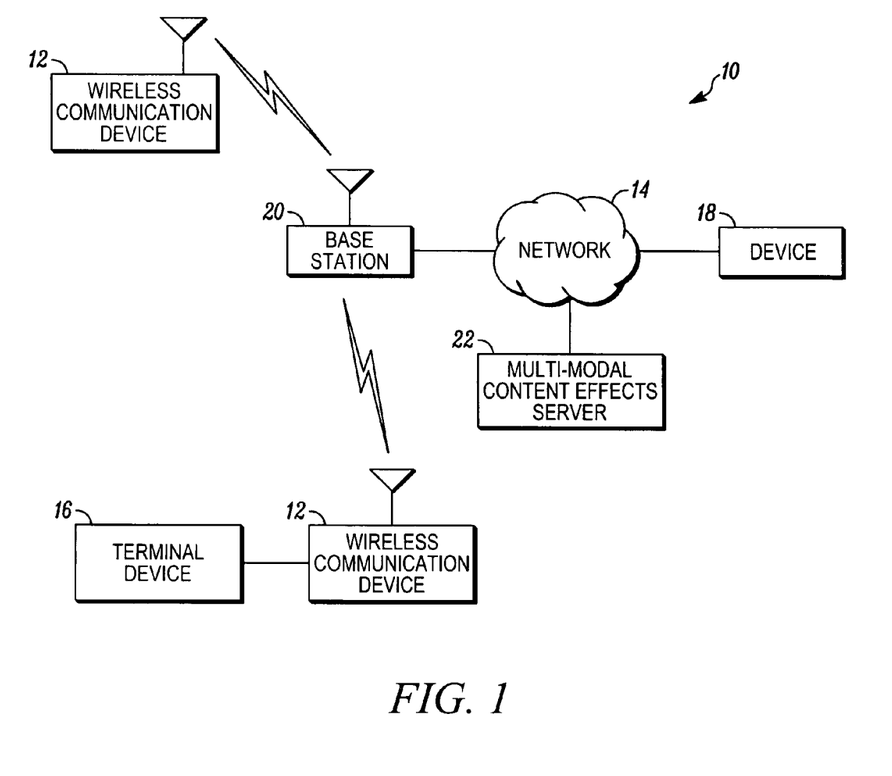
FIG. 1 is a block diagram of an exemplary communication network.

FIG. 1 is a block diagram of an exemplary communication network 10 including a pair of wireless communication devices 12, which separately communicate within the network. The wireless communication devices 12 can be any suitable device capable of communicating over a wireless connection within a network, for example one or more of the wireless communication devices could be a wireless radio telephone, such as a cellular telephone. Alternatively, the wireless communication device could incorporate a wireless LAN connection, a short range radio transceiver, such as a Bluetooth transceiver, an infra-red communication transceiver, or other similar communication device not constrained by a physical wired connection.

The wireless devices 12 in some instances may be self contained and operate independently. In other instances, the wireless communication device will couple to a terminal device 16, and will facilitate the terminal device communicating with the network 14. At least some wireless communication devices 12 will couple to the network 14 via a base station 20, or other type of wireless transceiver, which is physically coupled to the network 14 via a wired connection.

The network 14 may include any type of network that is capable of sending and receiving communication signals. In at least one embodiment, the network 14 includes a wireless communication network. The network 14 may also include or be in communication with a data network, such as the Internet, an Intranet, a local area network (LAN), a wide area network (WAN), a cable network, and other like communication systems. The network 14 may also include or be in communication with a telecommunications network, such as a local telephone network, long distance telephone network, cellular telephone network, satellite communications network, cable television network and other like communications systems. Furthermore, the network 14 may include or be in communication with more than one network and may include a plurality of different types of networks. Thus, the network 14 may include or be in communication with a plurality of data networks, a plurality of telecommunications networks, a combination of data and telecommunications networks and other like communication systems.

The exemplary communication network can additionally include one or more devices 18, which are coupled to the network via a wired connection, like a personal computer. For example, the personal computer can be coupled to the network via a dial-up modem or a cable modem connection. Additionally coupled to the network are various servers, which supply various types of information, such as web pages, internet address to domain name translations, and the like. In some instances, the servers supply user accessible content, which is of direct interest to the user. In other instances, the servers supply information useful in managing the operation of the network.

In at least one embodiment of the present invention, a multi-modal content effects server 22 is provided. In the illustrated embodiment the server 22 is coupled to the network via a wired connection, however, it is also possible for the server to support a wireless connection to the network.

The multi-modal content effects server 22 could also be integrated as part of the network 10. In some instances, the functionality of the server can be incorporated in one or more other network elements, including a target device, which is intended to receive the arrangement of tokens for playback, and a device upon which the multi-model content is encoded.

Figure 2:
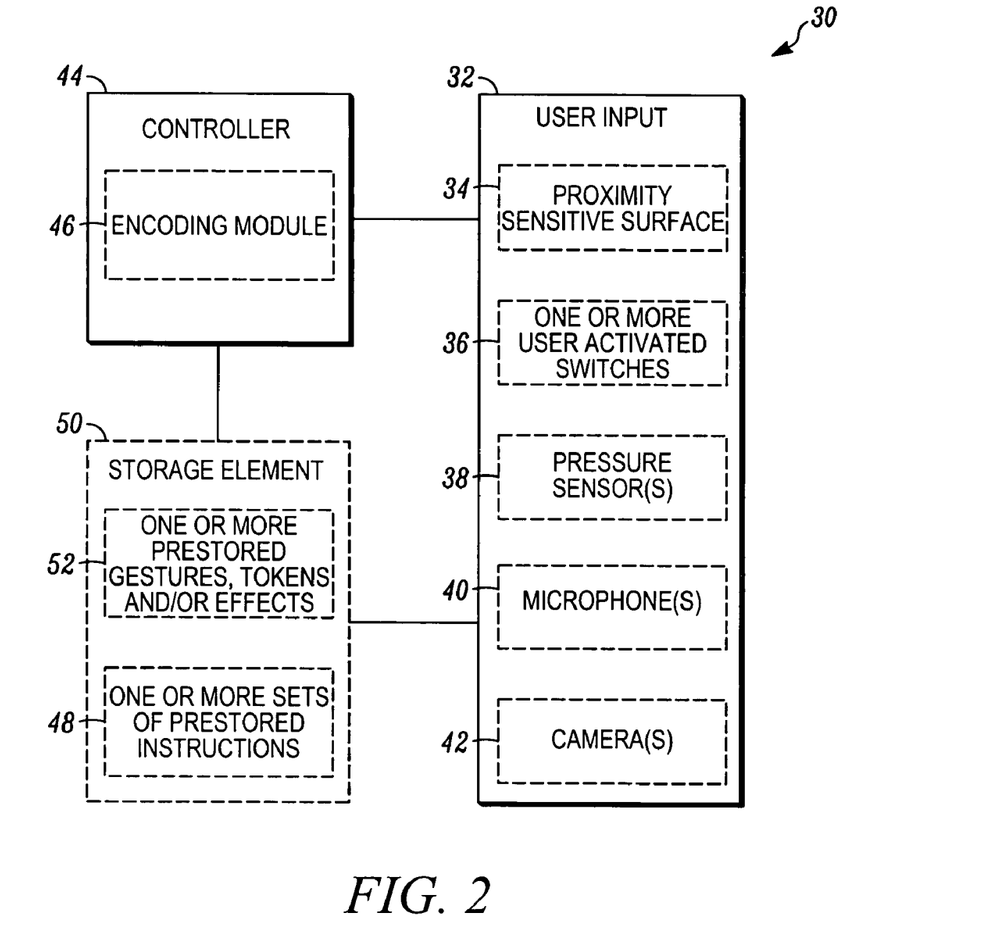
FIG. 2 is a block diagram of a composer circuit for composing device independent multi-model content, in accordance with at least one embodiment of the present invention.

FIG. 2 illustrates a block diagram of a composer circuit 30 for composing device independent multi-model content, in accordance with at least one embodiment of the present invention. In at least some of these embodiments, the composer circuit 30 is incorporated as part of a user device, such as a wireless communication device 12, a terminal device 16 or accessory coupled to the network 14 via the wireless communication device 12, and/or a device 18 coupled more directly to the network 14.

The composer circuit 30 includes a user input 32 adapted for receiving a user selection corresponding to one or more tokens associated with one or more standard predefined effects, which can be reproduced on a target device. The standard predefined effects are generic descriptions, which can be mapped onto one or more of the effect producing element associated with a corresponding target device for producing an intended effect. Generally, one or more discernable inputs are associated with one or more corresponding tokens, such that when a discernable input is detected, the corresponding token is added to an arrangement of tokens being composed.

In some instances, the tokens may relate to generic envelope definitions of a signal to be conveyed to at least one of the one or more effect producing elements. The user input can include one or more elements for receiving input from a user. Examples of elements forming all or parts of the user input 32 include a proximity sensitive surface 34, such as a touch sensitive screen, one or more user actuated switches 36, such as those contained as part of a keypad, pressure sensor(s) 38, microphone(s) 40, and/or camera(s) 42.

A proximity sensitive surface 34, such as a touch screen, which is capable of detecting movement across the surface in at least a two dimensional plane, could be used to detect one or more gestures that are each associated with one or more corresponding tokens. A gesture can correspond to the tracing as defined by the end of a stylist or the end of a user's finger, as the outline of the gesture is traced along the proximity sensitive surface 34. Other forms of user input can be used to alternatively identify and select desired tokens, and/or be used to select and/or identify one or more modifying parameters, and their corresponding values.

The composer circuit 30 additionally includes a controller 44, which is adapted to form an arrangement of tokens based upon the tokens selected by the user and correspondingly identified by the circuit 30. In at least some embodiments, the arrangement of tokens is produced as part of an encoding module 46, which forms part of the controller 44. In at least some instances, the controller incorporates one or more microprocessors, which execute routines written in executable code, as well as other circuitry for managing the control of the operation of the composer circuit 30 including the encoding module 46.

The encoding module 46, as well as any other modules which are included as part of the controller 44, can incorporate routines written in executable code and/or other circuitry for managing the functionality of the composer circuit 30 including forming an arrangement of one or more tokens. In some instances any executable code in the form of one or more sets of prestored instructions 48 could be stored in a storage element 50, which may be coupled to the controller and included as part of the composer circuit 30. Alternatively, any prestored instructions could be included as part of the controller 44. The prestored instructions could take the form of firmware, microcode, or a file containing a list of executable instructions. The storage element 50 could additionally contain one or more prestored gestures, tokens and/or effects 52, and any association therebetween, which might be used by the controller 44 in facilitating the forming of an arrangement.

By using tokens corresponding to standard predefined effects, an identification of a token in an arrangement can be used to reference an effect, such as a waveform profile and/or an envelope definition of a signal, which might otherwise require a larger amount of information to be represented adequately. In at least some embodiment, a standardized set of envelope definitions are known to the target device, which can be appropriately referenced by identifying the corresponding token identifier. In addition to envelope definitions, some of the tokens can be used to reference execution modifiers, such as a token which directs the envelope definition associated with another token to be repeated multiple times, or a token which marks the end of an arrangement. It is further possible to modify and/or further define a token using one or more parameters having a suitable value. In this way an amount of customization and/or modification can take place relative to a generic envelope definition without requiring that an entire waveform be reproduced and communicated as part of an arrangement. In this way a more bandwidth efficient encoding of multi-modal effects can be performed.

Figure 3:
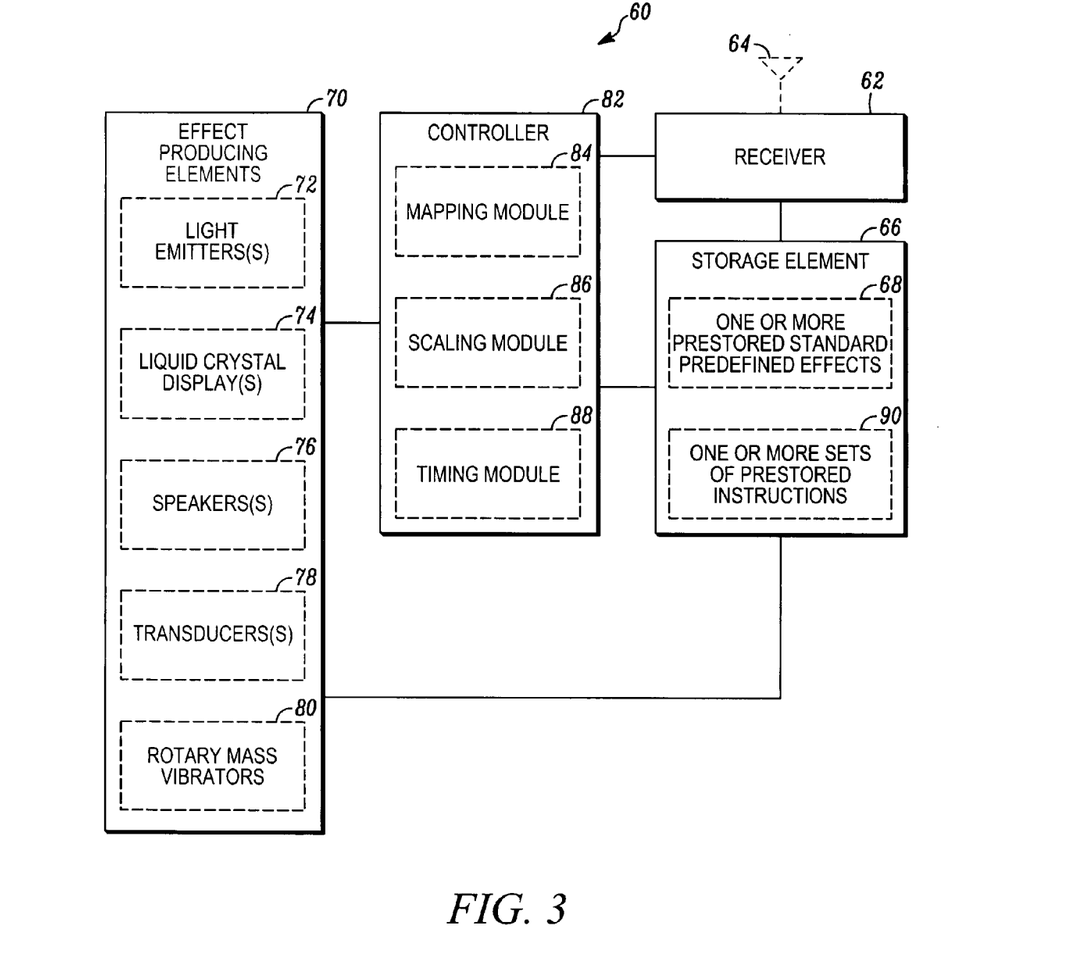
FIG. 3 is a block diagram of an effect producing circuit for playback of an arrangement of one or more tokens, in accordance with at least one embodiment of the present invention.

FIG. 3 illustrates a block diagram of an effect producing circuit 60 for playback of an arrangement of one or more tokens, in accordance with at least one embodiment of the present invention. In at least some of these embodiments, similar to the composer circuit 30, the effect producing circuit 60 is incorporated as part of a user device, such as a wireless communication device 12, a terminal device 16 or accessory coupled to the network 14 via the wireless communication device 12, and/or a device 18 coupled more directly to the network 14.

The effect producing circuit 60 includes a receiver 62 for receiving an arrangement of one or more tokens. In at least some embodiments, the arrangement comprising one or more of a plurality of tokens, is received as part of at least one of a message, and a file, such as an SMS message, or a MPEG or MIDI file. The arrangement could also be potentially sent as part of an active circuit switched or packet data telephone call connection.

In at least some embodiments, the receiver will be coupled to an antenna 64 for facilitating wireless communications between the source of the arrangement and the effect producing circuit 60. In other instances the receiver 62 may be more directly coupled, via a tethered connection, to the source of the arrangement.

The effect producing circuit 60 additionally includes a storage element 66, which includes one or more prestored standard predefined effects 68, which are each associated with a corresponding token. The effect producing circuit 60 further includes one or more effect producing elements 70, which are capable of rendering at least one type of effect. At least a couple of examples of effects include lighting effects, nonverbal sound effects, and vibrational effects. Examples of effect producing elements include light emitting elements 72 (i.e. Light Emitting Diodes (LED's)), displays 74 (i.e. Liquid Crystal Displays (LCD's)), speakers 76, transducers 78, and rotary mass vibrators 80. In some instances some effect producing elements may be capable of producing more than one type of effect. For example, a multifunctional transducer can produce both an audio and a vibrational output. One skilled in the art will realize that other types of devices, capable of producing the types of effects specifically noted above, as well as other user perceivable effects, are possible without departing from the teachings of the present application.

The effect producing circuit 60 still further includes a controller 82, which has a mapping module 84 that is adapted for mapping the standard predefined effects associated with the tokens in the received arrangement with the one or more effect producing elements. In some instances, a token will be directed to a type of effect that is not supported by the target device and/or is not perceivable by the intended user. In these instances the affected effects may be either ignored or remapped to another type of effect. Such a remapping may be effective in accommodating users having a particular disability. For example, the hearing impaired may elect to map audio effects to either a vibrational effect producing element or a lighting effect producing element. Such a setting could be stored as a user preference, or could make use of a default setting based upon a known condition.

In mapping an effect to one or more particular effect producing elements, an effect may have associated location characteristics, which might dictate the particular effect producing element for use, which is preferred. For example, a device may have multiple audio producing elements, which produce a signal which are discernable as originating from different locations, such as from the right or from the left. In these instances, a particular parameter which defines source location may be used. Still further it may be possible to send suitable signals to more than one audio producing element to create effects having still greater variety and/or granularity in terms of their perceived characteristics. In some instances it may be possible to capture location based information relative to the effect, when such information for an effect can be detected and correspondingly encoded.

Still further, the playback of the effect in the target device can additionally accommodate differences in rendering capabilities by scaling the effects before the effects are forwarded to the corresponding effect producing elements. Such a scaling could be performed locally in the controller 82 as part of a scaling module 86.

In at least some instances, the controller 82 can include a timing module, which allows multiple tokens to be rendered during overlapping time segments, where at least a portion of one effect is rendered during the same time period as the rendering of at least a portion of another effect associated with another token. The overlap during playback of at least a pair of effects can be accommodated through the use of temporal parameters, which can be used to more directly define the time during which the effect is rendered by the corresponding effect producing elements 70. Such effects could be managed with the assistance of a timing module 88, which in at least some embodiments is part of the controller 82.

Similar to the encoding module 46 in conjunction with the composer circuit 30, the mapping module 84, the scaling module 86, and the timing module 88 can include executable code in the form of one or more sets of prestored instructions 90, which can be stored in the storage element, for execution by the controller 82. Similar to the controller 44 of the encoding circuit 30, the controller 82 of the effect producing circuit 60 in at least some embodiments can incorporate one or more microprocessors, which execute routines written in executable code, as well as incorporate other circuitry for managing the control of the operation of the effect producing circuit 60.

By controlling the rendering on a target device, wherein an effect producing circuit 60 has information concerning the rendering capabilities of the target device, and the relationship between the target device and the standard predefined effects is similarly known, any conversion of the signals to be forwarded to the one or more effect producing elements 70 which best represents the effect on the target device can be determined, thereby enabling the multi-modal content to be more device independent.

While the effect producing circuit 60 described in connection with FIG. 3, illustrates at least one particular embodiment which includes a scaling module 86 and a mapping module 84 that allows for the remapping of effects, in at least a further embodiment similar functions can additionally and/or alternatively be provided in conjunction with a server 22, which in at least some embodiments manages the conveyance of multi-modal content between the encoding circuit and the effect producing circuit, as described and illustrated with respect to FIG. 4. The use of a server 22 as an intermediary represents an alternative to embodiments, where the multi-modal content is forwarded to a target device, independent of a server 22.

Figure 4:
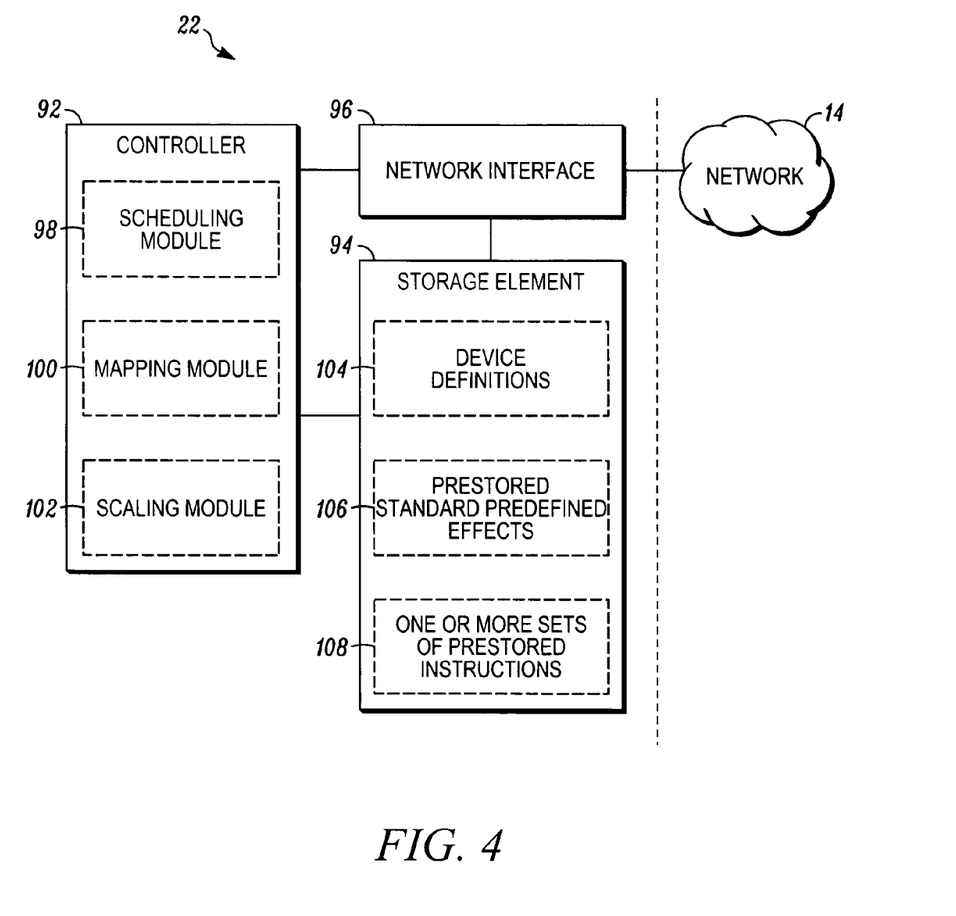
FIG. 4 is a block diagram of a multi-modal content effects server, illustrated in FIG. 1.

FIG. 4 is a block diagram of a multi-modal content effects server 22, in accordance with at least one embodiment. The multi-modal content effects server 22 includes a controller 92, a storage element 94, and a network interface 96. In at least one embodiment, the controller 92 includes a scheduling controller 98, which monitors the connectivity status of the target device upon which the multi-modal content is to be rendered and manages the transmission of the information to the target device. If the target device is unavailable, the content could be temporarily stored for later transmission. In at least some embodiments, the storage element 94 includes device definitions 104, which enable the server to provide for any necessary mapping and scaling under the control of corresponding modules 100 and 102 in the controller 92. In at least some embodiments, the mapping module 100 and the scaling module 102 operate similar to the mapping module 84 and the scaling module 86 in the controller 82 of the effect producing circuit 60. However in at least some instances, the provision for mapping and scaling in the server might benefit from device definitions 104 that have been kept fairly up to date. Alternatively, the server could poll the target device for any updated target device information, as necessary.

In at least some embodiments, the storage element may additionally include prestored standard predefined effects 106, and one or more sets of prestored instructions 108 in support of the operation of the one or more controller modules.

The network interface 96 facilitates communications between the server and the network 14 including any devices coupled to the network 14, but which is not otherwise coupled to the server 22.

Figure 5:
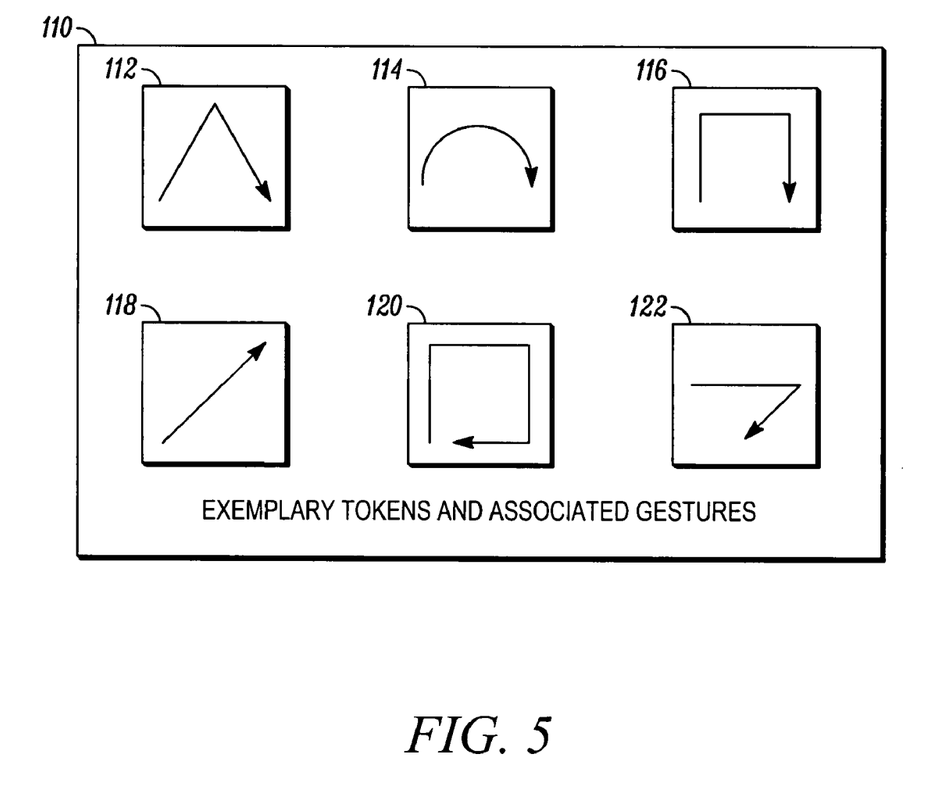
FIG. 5 is a pictorial listing of a plurality of exemplary tokens and associated gestures, in accordance with at least one embodiment of the present invention.

FIG. 5 illustrates a pictorial listing 110 of a plurality of exemplary tokens and associated gestures, in accordance with at least one embodiment of the present invention. As noted previously, the tokens can include generic envelope definitions and execution modifiers. In the illustrated embodiment, at least four tokens corresponding to generic envelop definitions are illustrated. A spike pulse 112 is shown as having a gesture including two lines forming a peak similar to the upper portions of a triangle. A bump pulse 114 has a gesture including a single curved line having a convex surface facing upward and a convex surface facing downward. A square pulse 116 has a gesture including three sides of a square, which initially moves from the lower left, up, to the right, and then down. A crescendo pulse 118 has a gesture which begins at the lower left corner and then moves toward the upper right corner. The four gestures corresponding to generic envelope definitions, generally travel from left to right.

In the illustrated embodiment, at least two tokens corresponding to an execution modifier are illustrated. A first execution modifier has a gesture 120 represented by all four sides of a square, beginning in the lower left corner, moving up, to the right, moving down, and to the left. This gesture 120 represents a repeat, which can be used to modify the number of times the previous token is repeated. The last token has a gesture 122, which includes a left to right horizontal line, which then doubles back, partially, angling downward. This gesture 122 represents a send command marking the end of the current arrangement.

Figure 6:
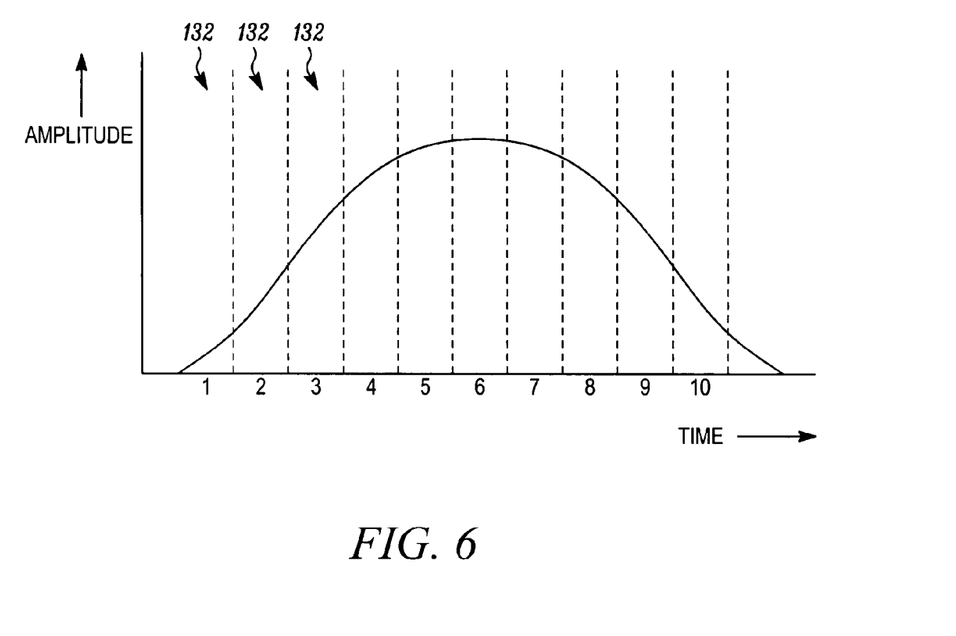
FIG. 6 is a graph illustrating an exemplary generic envelope definition corresponding to a token, which includes multiple time slices.

While each token generally has a standard predefined effect, certain characteristics can be modified by identifying one or more parameters, and corresponding values for each of the parameters. In some instances, a parameter can be applied to the entire token. In other instances, a parameter can be applied to modify a portion of the standard predefined effect. Some parameters allow for different values to be applied to specific time slices. FIG. 6 is a graph illustrating an exemplary generic envelope definition 130 corresponding to a token, which includes multiple time slices 132. In this way, parameters which effect parameter values such as duration and amplitude can be selectively applied to all or less than all of the time slices. Generally a parameter and a corresponding value will be identified, where a departure from the standard predefined effect is desired. Tokens corresponding to execution modifiers can similarly be defined by one or more parameters. For example the repeat token can be followed by a numeric value, which represents the number of times the preceding token should be repeated.

In some devices, where the multi-modal effect is being composed, the device may have a numeric keypad, which facilitates easier entry of a numeric value. In devices that do not include a numeric keypad alternative ways to enter a number may be possible. For example, a number could be entered using a gesture on a proximity or touch sensitive surface. Alternatively, a key could be depressed a number of times corresponding to the desired number to be entered. One skilled in the art will readily appreciate that there are numerous ways in which different types of data such as numbers could be entered without departing from the teachings of the present invention.

In some instances, the type of effect may similarly need to be defined, as the same generic envelope definitions may be applicable to more than one type of effect. Where a token has been associated with a lighting effect, at least one parameter may enable the composer to include a parameter defining a color value for all or a part of the generic envelope definition.

Parameters affecting start times and end times can similarly be used, which will allow tokens to be defined for different effects, which are defined to occur during at least partially overlapping or simultaneous time segments, which would allow the possibility of some effects being time synchronized.

Figure 7:
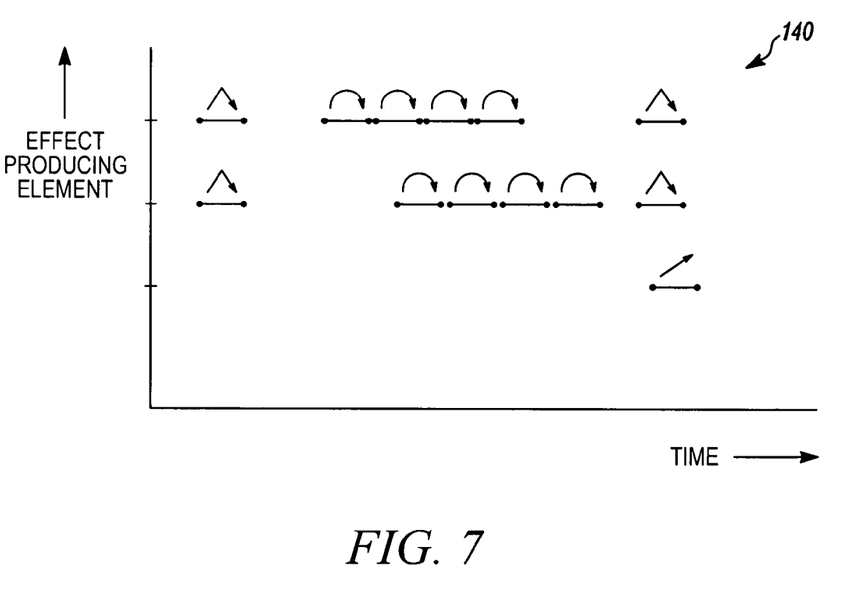
FIG. 7 is a graph illustrating an exemplary temporal relationship of multiple tokens for multiple effect producing elements.

FIG. 7 is a graph 140 illustrating an exemplary temporal relationship of multiple tokens for multiple effect producing elements. In the illustrated example, the effect producing element "A" could correspond to a left side vibratory effect, the effect producing element "B" could correspond to a right side vibratory effect, and the effect producing element "C" could correspond to a global lighting effect.

The middle effect consisting of four repeated bump pulses, corresponding to each of effect producing elements "A" and "B", and which are slightly offset, could be the result of a single effect having five repeated bump pulses, which has been defined as having a location characteristic that started on the left and moved to the right. In a device having vibrational effect producing elements, which are respectively located in each of the four corners, the "A" line effect might be sent to both the upper and lower left vibrational effect producing elements, and the "B" line effect might be sent to both the upper and lower right vibrational effect producing elements. Presumably, the effect producing circuit 60, would know the device specific characteristics, and would appropriately map the effects to the effect producing elements 70.

In devices which have only a signal vibrational effect producing element, the "A" line effect could be merged with the "B" line effect, which may be a desirable matching for that particular device. In this way, the intended effects can be appropriately mapped to a particular device pursuant to the capabilities of the device.

If a global lighting feature does not exist for the device, the "C" line effect may be remapped to flash any existing LCD. If the device has no lighting effects capability, or if the user is visually impaired and has set user preferences to remap lighting effects, the "C" line effect can be either ignored or remapped to a sound effect producing element or a vibrational effect producing element per user preference, or default setting (i.e. in absence of a user preference).

It is further possible that supplemental sensing and effect producing capabilities could be added to a particular device in the form of an accessory, which is coupled to the target device. In such a case, the effect producing circuit would need to establish access to the supplemental effect producing elements, and the module performing the mapping 84 or 100, would need to be aware of the extended capabilities. Similarly, the composer circuit would need access to the accessory to be able to interact with the additional capabilities. Such an accessory could include a cover and/or bag which extends around the original device or alternatively could be an accessory which resides proximate to the device, like a sense pillow, shaped similar to a mouse pad, with which the user can alternatively interact.

Figure 8:
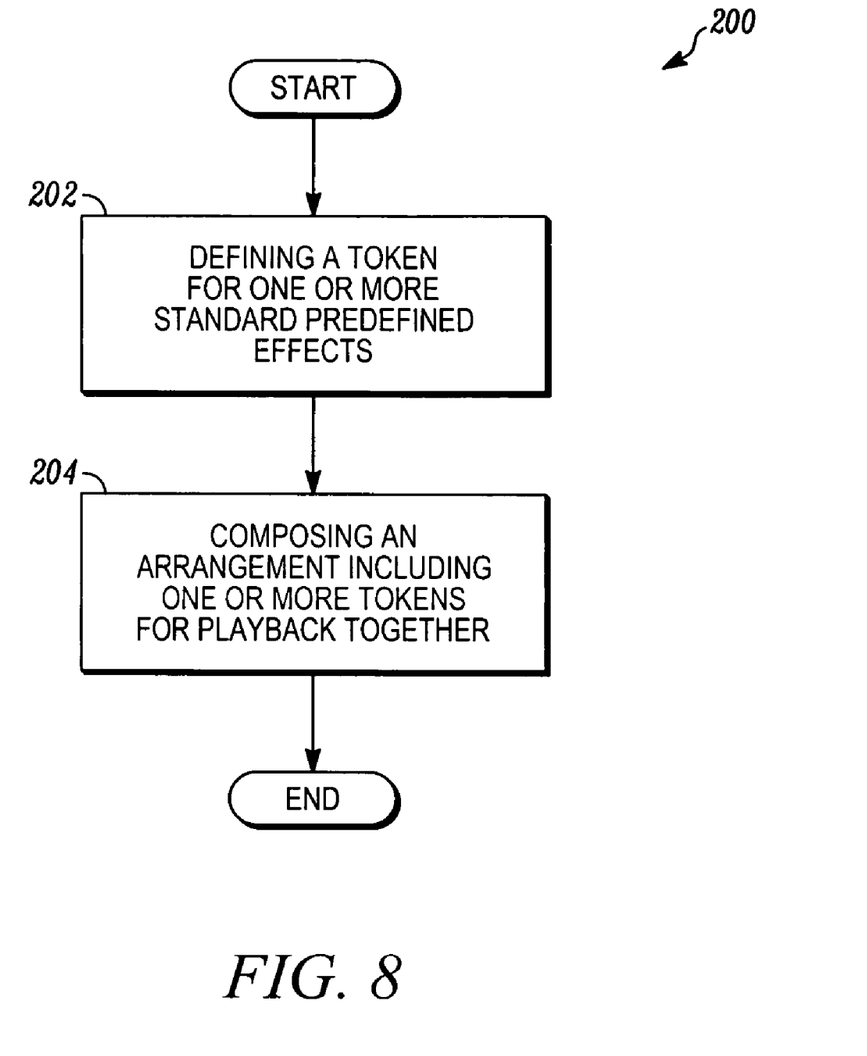
FIG. 8 is a flow diagram of a method for encoding device independent multi-modal content, in accordance with at least one embodiment of the present invention.

FIG. 8 is a flow diagram of a method 200 for encoding device independent multi-modal content, in accordance with at least one embodiment of the present invention. The method 200 includes defining 202 a token for one or more standard predefined effects. An arrangement including one or more tokens for playback together, is then composed 204.

Figure 9:
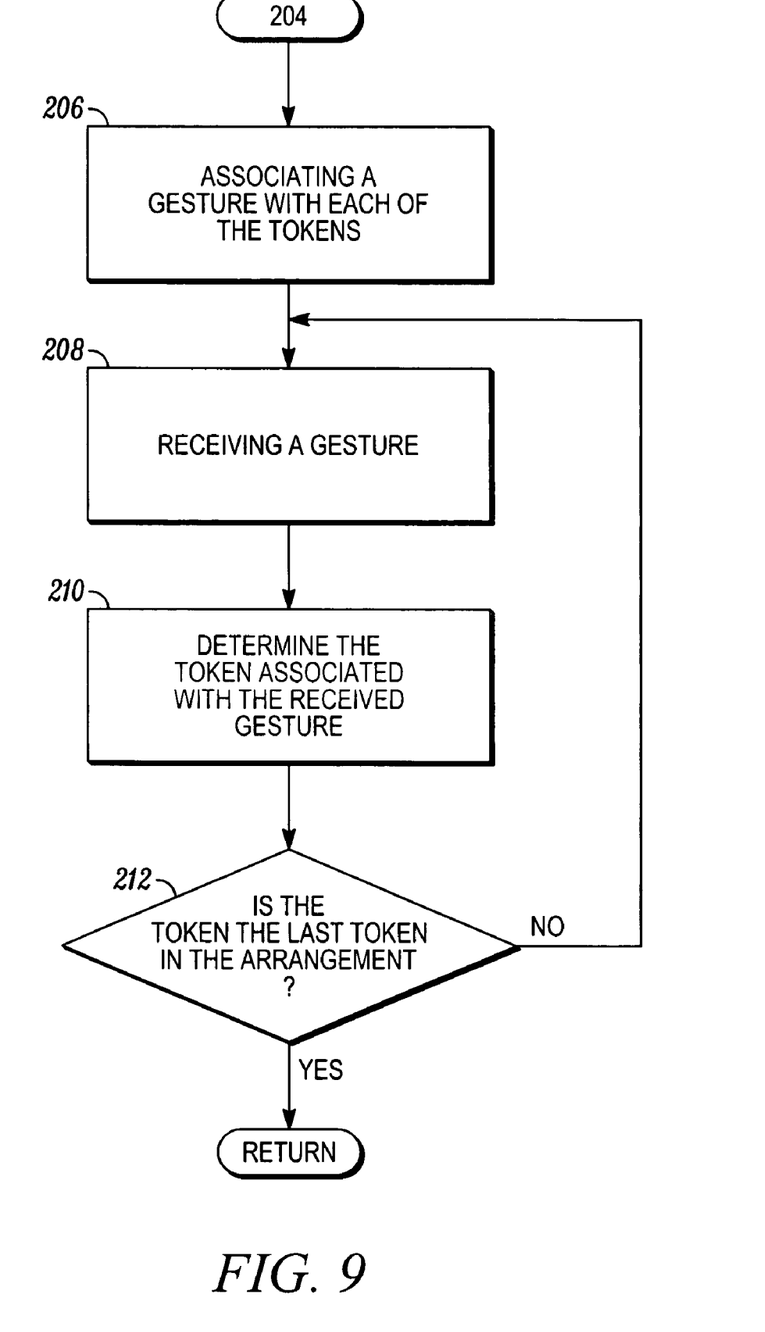
FIG. 9 is a more specific flow diagram of composing an arrangement including one or more tokens for playback together.

FIG. 9 is a more specific flow diagram of composing 204 an arrangement including one or more tokens for playback together, in accordance with at least one embodiment. In the more specific flow diagram, composing 204 includes associating 206 a gesture with each of the tokens, a gesture is then received 208, and a determination 210 is made as to which token is associated with the received gesture. If the token is the last token in the arrangement, then no more gestures are received. If the token is not the last token then the method proceeds to receive 208 a further gesture, and continue from there.

Figure 10:
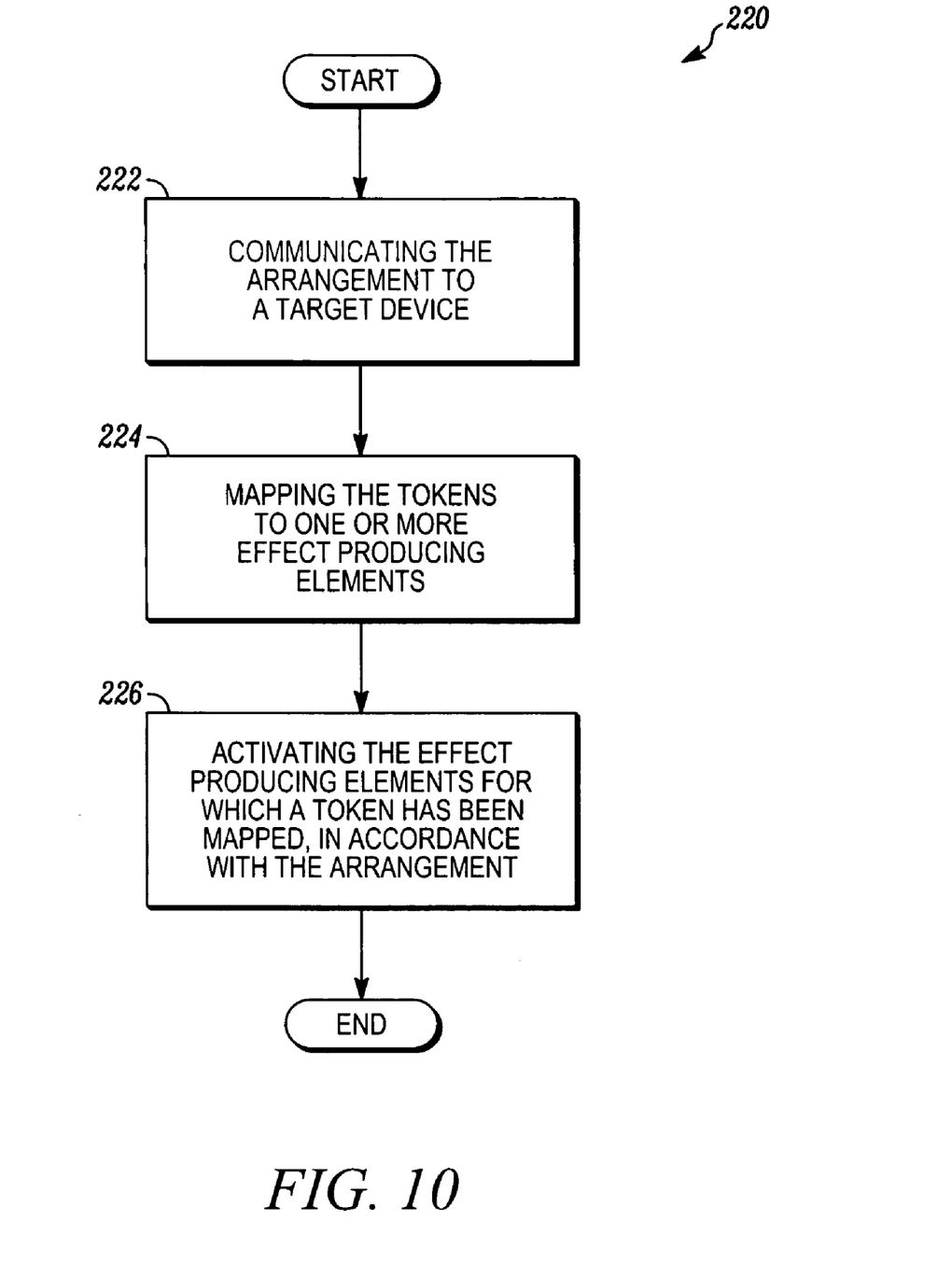
FIG. 10 is a flow diagram of a method for playing back an encoded arrangement.

FIG. 10 is a flow diagram of a method 220 for playing back an encoded arrangement. The method 220 includes communicating 222 the arrangement of one or more tokens to a target device. The tokens are then mapped 224 to the one or more effect producing elements in the target device. The effect producing element are then activated 226 for which a token has been mapped, in accordance with the arrangement.

While the preferred and other embodiments of the invention have been illustrated and described, it will be clear that the invention is not so limited. For example, while several different tag embodiments have been illustrated and described, one skilled in the art will readily appreciate that still further tag embodiments are possible without departing from the teachings of the present invention. Numerous modifications, changes, variations, substitutions, and equivalents will occur to those of ordinary skill in the art without departing from the spirit and scope of the present invention as defined by the following claims.

What is claimed is:

1. A method for encoding device independent multi-modal content including an arrangement comprising one or more of a plurality of mode-independent tokens, each token corresponding to a standard predefined effect, said method comprising:

defining a token for each of one or more standard predefined effects, each token referencing a different generic envelope definition of a signal, and each token being compatible for playback via a plurality of different types of effect producing elements that includes effect producing elements for at least two different sensory modes, wherein the generic envelope definition referenced by the token is adapted for being mapped to one or more effect producing elements in another device including a target device; and composing one or more tokens for playback together as an arrangement.

2. A method in accordance with claim 1, wherein at least some of the tokens comprise execution modifiers.

3. A method in accordance with claim 1, wherein the tokens are adapted to selectively include one or more parameters, which can modify the token.

4. A method in accordance with claim 3, wherein at least some of the generic envelope definitions includes multiple slices, which can each be separately modified with one or more parameters.

5. A method in accordance with claim 3, wherein at least some of the one or more parameters includes one or more values.

6. A method in accordance with claim 5, wherein the at least some of the parameters include one or more values, wherein the one or more values define an intended location relative to the target device of an effect intended to be produced.

7. A method in accordance with claim 5, wherein the at least some of the parameters include one or more values, wherein the one or more values define one or more temporal parameters, which define when an effect is intended to be produced.

8. A method in accordance with claim 7, wherein the values of the temporal parameters are defined for at least two tokens, such that an effect associated with at least a portion of a first token occurs at the same time that an effect associated with at least a portion of a second token occurs.

9. A method in accordance with claim 1, further comprising:

associating a gesture with each of the tokens;
receiving one or more gestures; and
determining the token associated with each of the received gestures.

10. A method in accordance with claim 9, wherein a gesture includes a detected stroke having a discernable pattern.

11. A method in accordance with claim 10, wherein the stroke is performed across a proximity sensing surface.

12. A method in accordance with claim 1, further comprising:

communicating the arrangement to a target device;
mapping the tokens to one or more effect producing elements in the target device; and
activating the one or more effect producing elements for which a token has been mapped in the target device in accordance with the arrangement of tokens.

13. A method in accordance with claim 12, wherein the mapping is executed on the target device in accordance with capabilities of the target device.

14. A method in accordance with claim 13, wherein tokens directed to effects that do not have a corresponding effect producing element, are remapped to produce a substitute effect on an alternative effect producing element.

15. A method in accordance with claim 13, wherein mapping the tokens to one or more effect producing elements in the target device includes scaling the standard predefined effect associated with the token, where the associated effect differs from the capabilities of the effect producing elements of the target device.

16. A method in accordance with claim 12, wherein the arrangement is communicated by a source device.

17. A method in accordance with claim 16, wherein the arrangement is communicated as part of at least one of message, and a file.

18. A method in accordance with claim 16, wherein the source device is a wireless communication device.

19. A method in accordance with claim 12, wherein the arrangement is communicated via an intermediate server.

20. A method in accordance with claim 19, wherein the intermediate server includes a definition of the target device including the available effect producing elements and corresponding capabilities in the target device, where the intermediate server will selectively remap and selectively scale the standard predefined effects in accordance with the capabilities of the effect producing elements in the target device.

21. A method in accordance with claim 12, wherein mapping the tokens to one or more effect producing elements in the target device is based upon user preferences.

22. A method in accordance with claim 1, wherein the target device is a wireless communication device.

23. A method in accordance with claim 1, wherein effect includes one or more of lighting effects, vibrational effects, and nonverbal sound effects.

24. A composer circuit in an apparatus for encoding device independent multi-modal content including an arrangement comprising one or more of a plurality of mode-independent tokens, said composer circuit comprising:

a user input adapted for receiving a user selection corresponding to one or more tokens associated with one or more standard effects intended for playback on another device including a target device, where each token references a different generic envelope definition of a signal, and the generic envelope definition referenced by each token is compatible for playback via a plurality of different types of effect producing elements that includes effect producing elements for at least two different sensory modes, and a controller adapted for forming an arrangement of one or more tokens intended to define the one or more standard predefined effects to be produced by one or more effect producing elements in the target device.

25. A composer circuit in accordance with claim 24, wherein the composer circuit is incorporated as part of a wireless communication device.

26. An effect producing circuit in an apparatus for playback of an arrangement of one or more mode-independent tokens, said effect producing circuit comprising:

a receiver for receiving an arrangement of one or more tokens associated with one or more standard predefined effects, where each token references a different generic envelope definition of a signal, and the generic envelope definition referenced by each token is compatible for playback via a plurality of different types of effects producing elements that include effects producing elements for at least two different sensory modes;

a storage element including one or more prestored standard predefined effects, each associated with a corresponding one of the one or more tokens;

one or more effect producing elements; and a controller adapted for mapping the standard predefined effects associated with the token in the received arrangement with the one or more effect producing elements.

27. An effect producing circuit in accordance with claim 26, wherein the effect producing circuit is incorporated as part of at least one of a wireless communication device and a device coupled to a wireless communication device.

* * * * *